United States Patent
Friedman et al.

(10) Patent No.: US 9,111,074 B1
(45) Date of Patent: Aug. 18, 2015

(54) LOGIN SYNCHRONIZATION FOR RELATED WEBSITES

(71) Applicant: Google Inc., Mountain View, CA (US)

(72) Inventors: Yaron Friedman, Sunnyvale, CA (US); Nilesh Agrawal, Santa Clara, CA (US); Tommy André Skancke Nyquist, San Jose, CA (US); Vinod Kumar Ramachandran, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 30 days.

(21) Appl. No.: 14/045,733

(22) Filed: Oct. 3, 2013

(51) Int. Cl.
*H04L 29/06* (2006.01)
*G06F 21/31* (2013.01)
*H04W 12/04* (2009.01)
*H04L 29/12* (2006.01)

(52) U.S. Cl.
CPC .............. *G06F 21/31* (2013.01); *H04W 12/04* (2013.01); *H04L 29/12066* (2013.01)

(58) Field of Classification Search
CPC ................. H04W 88/02; H04W 12/06; H04L 29/12066; G06F 8/61
USPC ................................................. 726/5; 713/31
See application file for complete search history.

(56) References Cited

U.S. PATENT DOCUMENTS

| | | | |
|---|---|---|---|
| 8,544,069 B1 * | 9/2013 | Subbiah et al. | 726/4 |
| 2011/0055593 A1 * | 3/2011 | Lurey et al. | 713/193 |
| 2011/0320955 A1 * | 12/2011 | O'Connor | 715/742 |
| 2012/0036241 A1 * | 2/2012 | Jennings et al. | 709/222 |
| 2012/0278872 A1 * | 11/2012 | Woelfel et al. | 726/7 |
| 2013/0219323 A1 * | 8/2013 | Kalu et al. | 715/780 |

\* cited by examiner

*Primary Examiner* — Dao Ho
(74) *Attorney, Agent, or Firm* — McDermott Will & Emery LLP

(57) ABSTRACT

Methods for or providing stored authentication information of one website for a related website are provided. In one aspect, a method includes receiving a first request to provide, for display, a webpage includes at least one authentication field, and receiving an identification of an absolute domain name for the webpage. The method also includes identifying a parent domain name from the absolute domain name, and determining whether stored authentication information for a user is available for the parent domain name. The method further includes providing, for display, a first notification to populate the stored authentication information for the user in the at least one authentication field when the stored authentication information is available for the parent domain name. Systems and machine-readable media are also provided.

13 Claims, 5 Drawing Sheets

LOGIN SYNCHRONIZATION FOR RELATED WEBSITES

BACKGROUND

1. Field

The present disclosure generally relates to the transmission of data over a network, and more particularly to the use of a computing device to provide authentication information to be communicated over a network.

2. Description of the Related Art

Certain web browsers permit a user to save login information in the web browser for various websites if the user provides authorization to do so. For example, a user visiting a webpage in a web browser located at the website "www.myemail.cxm" to login and gain access to an interface for the user's email may be asked to enter a username and password into respective login input fields. Upon successful entry of a username and password, the web browser may ask the user if the user wishes to save the login information in the web browser. If the user authorizes the web browser to do so, then thereafter when the user visits the website "www.myemail.cxm," the user may be prompted by the web browser to permit the web browser to automatically populate the login input fields with the saved login information. In some instances, a web browser may automatically populate the login input fields with the user's saved login information without prompting the user for authorization to do so, relying on the user's initial authorization to permit the login information to be saved. If, however, the user first visits a related website to "www.myemail.cxm", such as a mobile version of the website "mobile.myemail.cxm," then the user will be required to again enter the user's login information even though the login information for the mobile version of the website is the same as the login information for the non-mobile version of the website.

SUMMARY

According to certain embodiments of the present disclosure, a computer-implemented method for providing stored authentication information of one website for a related website is provided. The method includes receiving a first request to provide, for display, a webpage includes at least one authentication field, and receiving an identification of an absolute domain name for the webpage. The method also includes identifying a parent domain name from the absolute domain name, and determining whether stored authentication information for a user is available for the parent domain name. The method further includes providing, for display, a first notification to populate the stored authentication information for the user in the at least one authentication field when the stored authentication information is available for the parent domain name.

According to certain embodiments of the present disclosure, a system for providing stored authentication information of one website for a related website is provided. The system includes a memory that includes stored authentication information for a user, and a processor. The processor is configured to receive a first request to provide, for display, a webpage includes at least one authentication field, and receive an identification of an absolute domain name for the webpage. The processor is also configured to identify a parent domain name from the absolute domain name, and determine whether the stored authentication information includes login information for the user for the parent domain name. The processor is further configured to providing, for display, a first notification to populate the login information for the user in the at least one authentication field when the stored authentication information includes the login information for the user for the parent domain name. The login information is associated with a first hostname. The absolute domain name for the webpage includes a second hostname that is different than the first hostname associated with the login authentication information. The first notification includes an indicator of the first hostname and an indicator of the login information associated with the first hostname.

According to certain embodiments of the present disclosure, a machine-readable storage medium that includes machine-readable instructions for causing a processor to execute a method for providing stored authentication information of one website for a related website is provided. The method includes receiving a first request to provide, for display, a webpage includes at least one authentication field, and receiving an identification of an absolute domain name for the webpage. The method also includes identifying a parent domain name from the absolute domain name, and determining whether the parent domain name matches an entry in a list of registered domain names, and the stored authentication information for the user is available for the parent domain name. The method further includes providing, for display, a first notification to populate the stored authentication information for the user in the at least one authentication field when the stored authentication information is available for the parent domain name, and receiving a response to the first notification indicating a request to populate the stored authentication information for the user in the at least one authentication field. The method yet further includes populating the stored authentication information for the user in the at least one authentication field. The stored authentication information is associated with a first hostname, and the absolute domain name for the webpage includes a second hostname that is different than the first hostname associated with the stored authentication information. The first notification includes an indicator of the first hostname and an indicator of the stored authentication information associated with the first hostname.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
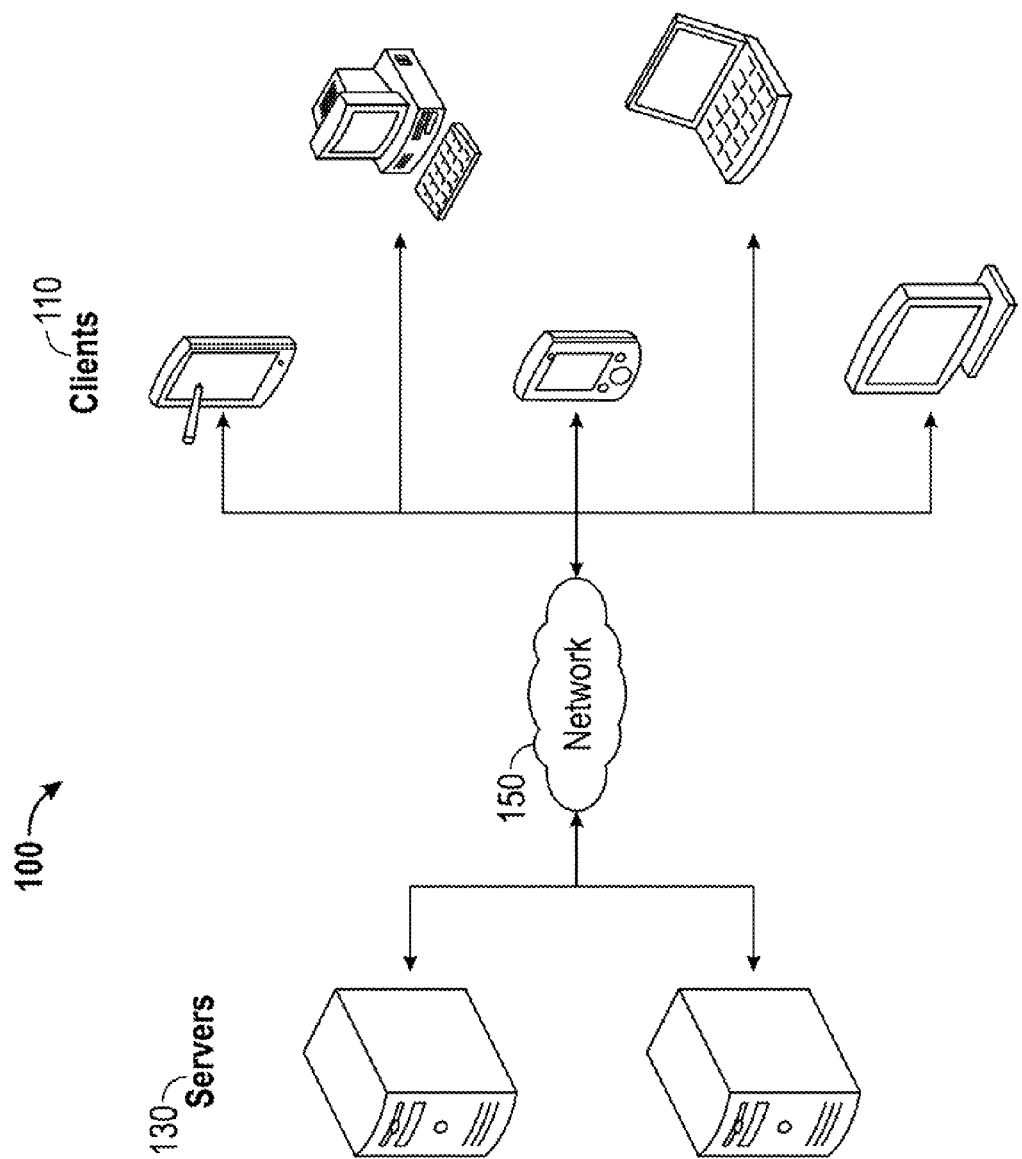
FIG. 1 illustrates an example architecture for providing stored authentication information of one website for a related website.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides a web browser that saves login information for a website and permits a user to use the saved login information to login in to a different, related website. For example, when a user visits the website "www.myemail.cxm" on a device, the disclosed web browser saves the user's login information for the website "www.myemail.cxm". When the user visits a website "mobile.myemail.cxm" that is a mobile version of the website "www.myemail.cxm", whether on the same device or a different (e.g., mobile) device, the disclosed system permits the user to allow the disclosed web browser to automatically populate the login input fields of "mobile.myemail.cxm" using the saved login information for "www.myemail.cxm". Related websites can be identified by the disclosed system by extracting the parent domain name (e.g., myemail.cxm) from the absolute domain name (e.g., www.myemail.cxm) of a website being visited, and then determining whether stored login information is available for the parent domain name. In certain aspects, for security purposes, the disclosed system further compares the hostname of the website being visited against a list of registered domain names in order to determine whether it is appropriate to prompt the user to have the system automatically populate login information for the website being visited.

Although many examples provided herein describe a user's information (e.g., username and password) being stored in memory, each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

FIG. 1 illustrates an example architecture 100 for providing stored authentication information of one website for a related website. The architecture 100 includes servers 130 and clients 110 connected over a network 150.

The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. Each client 110 is configured to host an application configured to display content (e.g., a webpage) that requires authentication. The content can be, for example, a webpage having an input field for entry of authentication information. The clients 110 may be connected to the servers 130 over the network 150 in order to download webpages and other content for display in the application. The application is also configured to store or otherwise have access to stored authentication information for websites. The application is further configured to identify whether a webpage for a website that has been loaded is related to a webpage for another website for which the application has access to authentication information. The determination may be made, for example, based on an analysis of the absolute domain name of the loaded webpage and the related webpage.

The servers 130 can be any device having an appropriate processor, memory, and communications capability for hosting the webpages for the websites. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
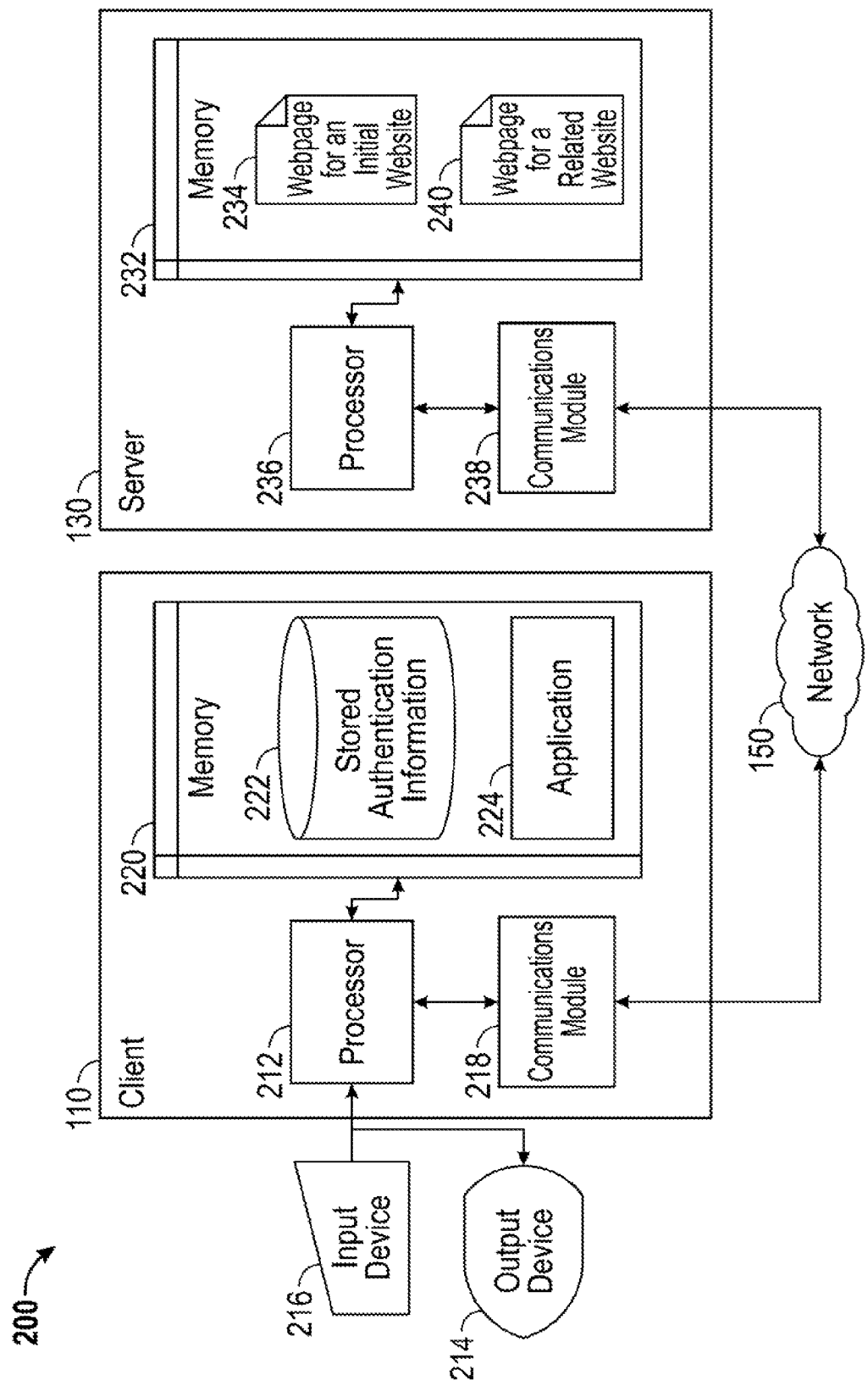
FIG. 2 is a block diagram illustrating the example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and memory 220 that includes an application 224 and stored authentication information 222 accessible by the application 224. The application 224 can be, for example, a web browser, search application, mobile application, or any other executable process configured to provide a webpage for display and submit information from a user to the webpage. The webpage can be, for example, a webpage for an initial website 234 or a webpage for a related website 240. Copies of the webpage for the initial website 234 and the webpage for the related website 240 can be provided from a memory 232 of a server 130 by a processor 236 over the network 150 via respective communication modules 218 and 238 of the client 110 and server 130. The copies may then be stored in the memory 220 of the client 110. In certain aspects, the stored authentication information 222 can be synchronized across multiple clients 110, such that, for example, a stored username and password combination entered for a webpage for an initial website 234 on a client associated with a user can be considered by an application 224 on another client associated with the user.

The client 110 also includes an input device 216, such as a touchpad, touchscreen, keyboard or mouse, and an output device 214, such as a display (e.g., touchscreen display). The processor 212 of the client 110 is configured to execute instructions, such as instructions physically coded into the processor 212, instructions received from software in memory 240, or a combination of both, for providing stored authentication information of one website for a related website.

For example, the processor 212 of the client 110 executes instructions to receive a first request to provide, for display (e.g., on output device 214), a webpage for a related website 240 to a webpage for an initial website 234. The webpage for the related website 240 includes at least one authentication field, although in certain aspects the webpage for the related website 240 includes a plurality of authentication fields. The authentication fields can include a field for a username and a field for a password associated with the username. The processor 212 is configured to receive an identification of an absolute domain name (e.g., www.mywebsite.cxm) for the webpage for the related website 240. The absolute domain name may be, for example, a fully qualified domain name.

The identification of the absolute domain name can be received by the processor 212, for example, by the application 224 instructing the processor 212 to remove the Hypertext Transfer Protocol (HTTP) prefix ("http://") from a Uniform Resource Locator (URL) address (e.g., http://www.mywebsite.cxnm) of the webpage for the related website 240. The processor 212 is further configured to identify a parent domain name (e.g., mywebsite.cxm) from the absolute domain name.

The processor 212 is also configured by the application 224 to determine whether stored authentication information 222 for a user is available for the parent domain name. For example, the application 224 is configured to store, with a user's permission, authentication information for the user in memory 220. The authentication information can be, for example, a username and password combination, unique user identifier, or other type of information for authenticating a user to a website. The authentication information for each website can be stored as an entry in a list of entries, with each entry including, for example, an identification of the website (e.g., URL, absolute domain name, or parent domain name) and an authenticated username and password for the website.

In certain aspects, the application 224 includes a list of registered domain names. The list of registered domain names may be loaded as part of the application 224 when the application is loaded on the client 110, or the list of registered domain names can be downloaded from an appropriate server 130 over the network 150 apart from and/or after the application 224 is loaded on the client 110. In certain aspects, the list of registered domain names may be updated based on information provided from an appropriate server 130. The list of registered domain names can be, for example, a catalog of Internet domain name suffixes. The list of registered domain names can include a collection of publicly registered domain names ("public suffix" or "effective top-level domain (eTLD)") such as "mywebsite.cxm". The publicly registered domain names can be acknowledged by an Internet authority such as the Internet Corporation for Assigned Names and Numbers (ICANN). The list of registered domain names can also include a collection of private additions for domain names that may permit the creation of subdomains, such as "mobile.mywebsite.cxm". In certain aspects, the processor 212 is configured to identify a first website as being related to a second website if the first website includes an approved hostname, such as the hostname "mobile" of a first website "mobile.mywebsite.cxm" as an approved hostname for a publicly registered domain name "mywebsite.cxm" of a second website "www.mywebsite.cxm".

The processor 212 in such instances may be configured to determine whether the stored authentication information 222 for the user is available for the parent domain name (e.g., mywebsite.cxm) by, for example, determining whether the parent domain name matches an entry in the list of registered domain names (e.g., to confirm the parent domain name is for a valid website), and that the stored authentication information 222 for the user is available for the parent domain name. The stored authentication information can be associated with a first hostname (e.g., "www" from "www.mywebsite.cxm") that is different than a second hostname (e.g., "mobile" from "mobile.mywebsite.cxm") included in the absolute domain name (e.g., "mobile.mywebsite.cxm").

When the stored authentication information is available for the parent domain name, the processor 212 is configured to provide, for display (e.g., on the output device 214), a first notification to populate the stored authentication information for the user in the at least one authentication field. For example, if the user is visiting a webpage for a related website 240 "mobile.mywebsite.cxm" of a webpage for an initial website 234 "www.mywebsite.cxm", and there is stored authentication information 222 for the webpage for the initial website 234, then a graphical user interface notification is displayed on the output device 214 prompting a user of the client 110 whether the user would like the stored authentication information 222 for the webpage for the initial website 234 to be used for the webpage for the related website 240. As such, the first notification can include an indicator of the first hostname (e.g., the hostname of the webpage for related website 240) and an indicator of the stored authentication information 222 associated with the first hostname. For instance, the first notification may display the absolute domain name "www.mywebsite.cxm" along with the previously authenticated and stored username for "www.mywebsite.cxm" from the stored authentication information 222, but not display the previously authenticated and stored password for "www.mywebsite.cxm" from the stored authentication information 222. The first notification can be displayed adjacent to or otherwise near the authentication field in the webpage for the related website 240, or the first notification can be displayed can be displayed elsewhere on the output device 214, such as near (e.g., immediately above or below) an onscreen keyboard.

In certain aspects, the processor 212 of the client 110 is configured to receive a response to the first notification indicating the request to populate the stored authentication information for the user in the authentication field, such as the user of the client 110 pressing an "ok" button provided in the first notification displayed on a touchscreen input device 216/output device 214. The processor 212 may then populate the stored authentication information 222 for the user in the authentication field. In certain aspects the processor 212 may also then automatically submit the populated authentication information, while in other aspects the user must manually submit the populated authentication information in order to ensure the user identifies the webpage for the related website 240 as being appropriate for the populated authentication information.

The processor 212 may store an indicator of the response to the first notification indicating the request to populate the stored authentication information for the user in the authentication field, for instance, to "remember" that the user has authorized the application 224 to populate the authentication field of the webpage for the related website 240 using the stored authentication information 222 for the webpage for the initial website 234. Consequently, when the processor 212 via the application 224 receives a second request, subsequent to the first request, to provide, for display, the webpage for the related website 240 that includes the authentication field, the processor 212 via the application 224 may then provide, for display, a second notification to populate the stored authentication information for the user in the at least one authentication field based on the stored indicator of the response to the first notification indicating the request to populate the stored authentication information for the user in the at least one authentication field.

For example, the second notification may include an indicator of the second hostname (e.g., of the webpage for the related website 240) and optionally an indicator of the stored authentication information 222 associated with the second hostname based on the user's previous authorization to the application 224 to populate the authentication field of the webpage for the related website 240 using the stored authentication information 222 for the webpage for the initial website 234. For instance, the second notification may display the absolute domain name "mobile.mywebsite.cxm" along with the previously authenticated and stored username for "mobile.mywebsite.cxm" from the stored authentication information 222. The second notification may also display the absolute domain name "www.mywebsite.cxm" along with the previously authenticated and stored username for "www.mywebsite.cxm" from the stored authentication information 222 that was displayed in the first notification.

In certain aspects, the processor 212 may provide the second notification for display in response to a selection of the authentication field. For example, upon a subsequent visit to the webpage for the related website 240 (e.g., subsequent to the visit in which the user provided a response to the first notification), the second notification may be displayed in the application 224 upon the user placing a cursor in or otherwise selecting the authentication field.

Additionally, in certain aspects, the application 224 does not provide the second notification for display, but instead proceeds to populate the stored authentication information for the user in the authentication field of the webpage for the related website 240 in response to the second request based on the stored indicator of the response to the first notification indicating the request to populate the stored authentication information for the user in the authentication field. In other words, because the user has previously authorized the stored authentication information 222 to be used to populate the authentication field of the webpage for the related website 240, the application 224 "remembers" this authorization and proceeds to use the stored authentication information 222 to automatically populate the authentication field of the webpage for the related website 240 during subsequent visits to the webpage for the related website 240 in the application 224 on the client 110. The application 224 may provide the user with the option to delete the authorization and/or stored authentication information 222 at any time.

Figure 3:
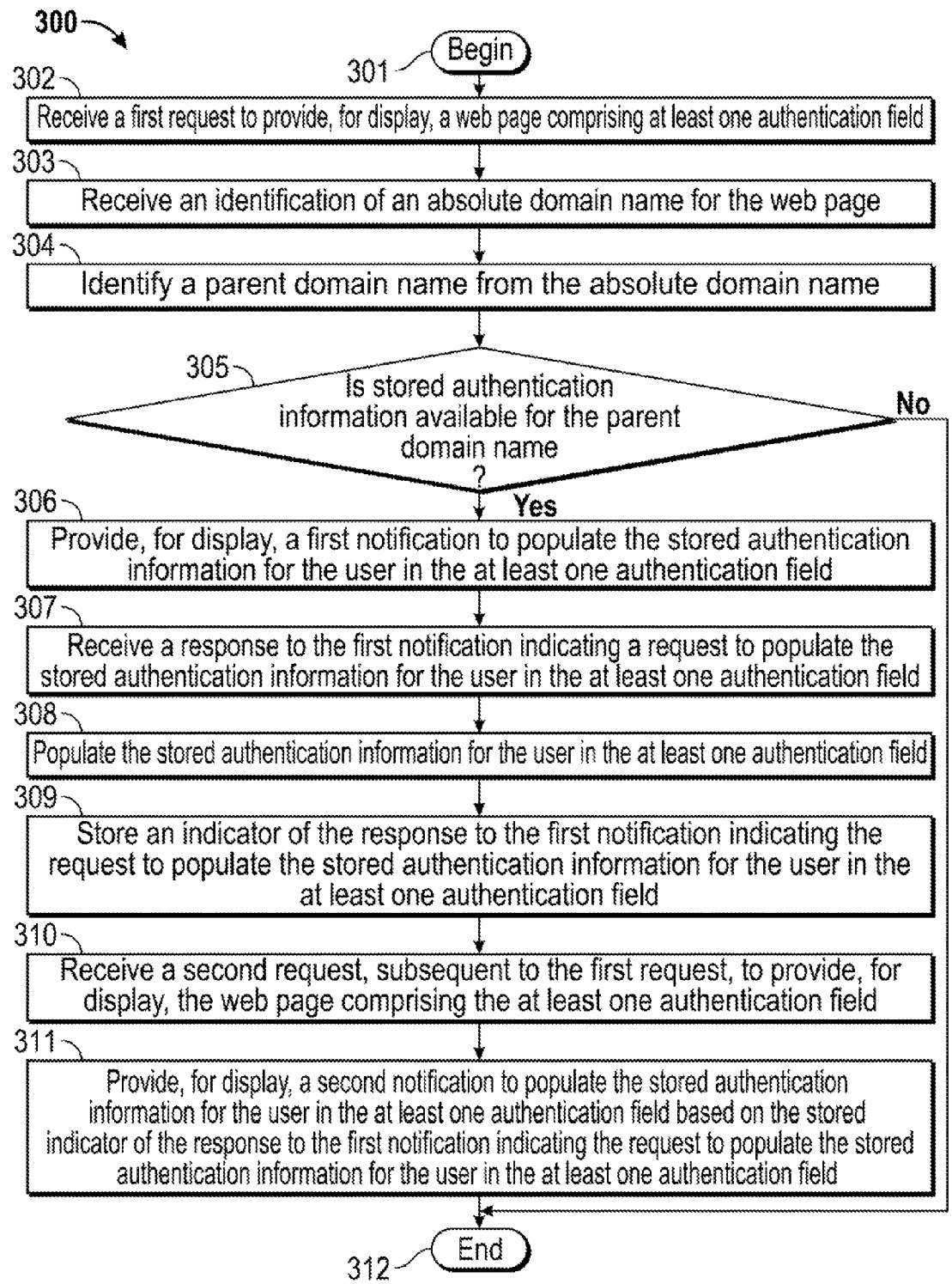
FIG. 3 illustrates an example process for providing stored authentication information of one website for a related website using the example client of FIG. 2.

FIG. 3 illustrates an example process 300 for providing stored authentication information of one website for a related website using the example client 110 of FIG. 2. While FIG. 3 is described with reference to FIG. 2, it should be noted that the process steps of FIG. 3 may be performed by other systems. The process 300 begins by proceeding from beginning step 301 when an application 224 is loaded on the client 110 to step 302 when the application receives a first request to provide, for display, a webpage (of a related website 240 to a webpage of an initial website 234) that includes at least one authentication field. Next, in step 303, the application receives an identification of an absolute domain name for the webpage of the related website 240, and in step 304 identifies a parent domain name from the absolute domain name. In decision step 305, the application 224 determines whether stored authentication information 222 for a user is available for the parent domain name.

If the determination of decision step 305 indicates that stored authentication information is not available for the parent domain name, the process 300 ends in step 312, otherwise if the determination of decision step 305 indicates that stored authentication information is available for the parent domain name, the process 300 proceeds to step 306. In step 306, the application 224 provides, for display, a first notification to populate the stored authentication information for the user in the one authentication field. Next, in step 307, the application 224 receives a response to the first notification indicating a request to populate the stored authentication information for the user in the at least one authentication field, and in step 308 populates the stored authentication information for the user in the authentication field.

In step 309, the application 224 stores an indicator of the response to the first notification indicating the request to populate the stored authentication information for the user in the authentication field.

Next, in step 310, the application 224 receives a second request, subsequent to the first request, to provide, for display, the webpage (of the related website 240) comprising the at least one authentication field, and in step 311 provides, for display, a second notification to populate the stored authentication information for the user in the authentication field based on the stored indicator of the response to the first notification indicating the request to populate the stored authentication information for the user in the authentication field. The process 300 then ends in step 312.

FIG. 3 set forth an example process 300 for providing stored authentication information of one website for a related website using the example client 110 of FIG. 2. An example will now be described using the example process 300 of FIG. 3, an application 224 that is a web browser, a client 110 that is a smartphone, a webpage for a related website 240 "mobile.twixter.cxm" to a webpage for an initial website "www.twixter.cxm" 234.

The process 300 begins by proceeding from beginning step 301 when the web browser 224 is loaded on the smartphone 110 to step 302 when the web browser 224 receives a first request to provide, for display, a webpage (of mobile.twixter.cxm 240, which is related to www.twixter.cxm 234) that includes two authentication fields, a username field and a password field. Next, in step 303, the web browser 224 identifies the absolute domain name "mobile.twixter.cxm" for the webpage of the related website 240, and in step 304 identifies a parent domain name "twixter.cxm" from the absolute domain name "mobile.twixter.cxm". In decision step 305, the web browser 224 determines that there is a stored authenticated username and password in memory for related website "www.twixter.cxm" that shares the same parent domain name "twixter.cxm", so the process 300 proceeds to step 306.

Figure 4:
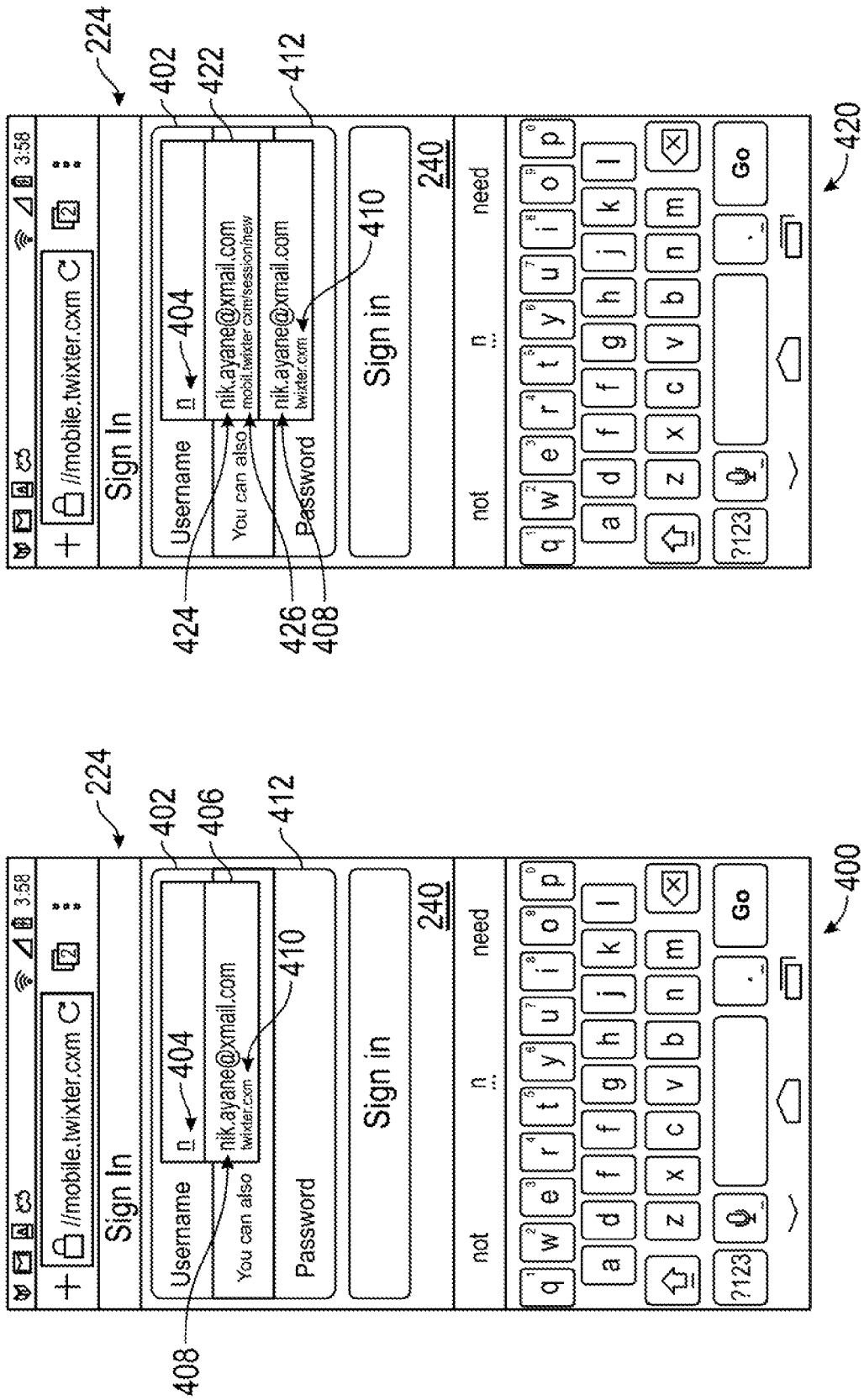
FIGS. 4A and 4B are example illustrations associated with the example process of FIG. 3.

In step 306, the web browser 224 provides, for display, a first notification to populate the stored authentication information for the user in the authentication fields of the webpage 240. FIG. 4A provides an example illustration 400 of the web browser 224 on the smartphone 110 displaying the webpage of mobile.twixter.cxm 240. The webpage 240 includes two authentications fields: a username field 402 and a password field 412. The first notification 406 to populate the username field 402 and the password field 412 is provided for display in the web browser 224 below the username field 402 upon a user beginning to type in the username field 402, which in the illustrated example is the letter "n" 404. The first notification 406 displays an email address 408 associated with the webpage for the initial website 234 for which there is stored authentication information 222, along with an identification 410 of the initial website 234.

Next, in step 307, the web browser 224 receives a response to the first notification 406, namely the user selecting the first notification 406 by touching the first notification 406, thereby indicating the user's request to populate the stored authentication information for the email address "nik.ayane@xmail.com" 408 into the username field 402 and password field 412. In step 308, the web browser 224 populates the stored authentication information for the email address "nik.ayane@xmail.com" 408 into the username field 402 and password field 412, and in step 309, the web browser 224 stores an indicator that the user has authorized the stored authentication information 222 for the email address "nik.ayane@xmail.com" 408 be used to populate the username field 402 and password field 412 of the webpage for the related website mobile.twixter.cxm 240.

Next, in step 310, the web browser 224 later receives a second request from the user to load the webpage for mobile.twixter.cxm 240 in the web browser 224. In step 311, after the webpage for mobile.twixter.cxm 240 is displayed in the web browser 224, the web browser 224 provides, for display, a second notification 422 to populate the stored authentication information for the email address "nik.ayane@xmail.com" 408 into the username field 402 and password field 412 based on the stored indicator that the user has authorized the stored authentication information 222 for the email address "nik.ayane@xmail.com" 408 be used to populate the username field 402 and password field 412 of the webpage for the related website mobile.twixter.cxm 240.

FIG. 4B provides an example illustration 420 of the second notification 422 that is provided for display in the web browser 224 on the smartphone 110 while displaying the webpage of mobile.twixter.cxm 240. In addition to displaying the email address 408 associated with the webpage for the initial website 234 for which there is stored authentication information 222, along with an identification 410 of the initial website 234 as provided in the first notification 406, the second notification also includes for display the email address 424 associated with the webpage for the related website 240 for which there is also stored authentication information 222 (e.g., from step 309), along with an identification 426 of the related website 240. The process 300 then ends in step 312.

Figure 5:
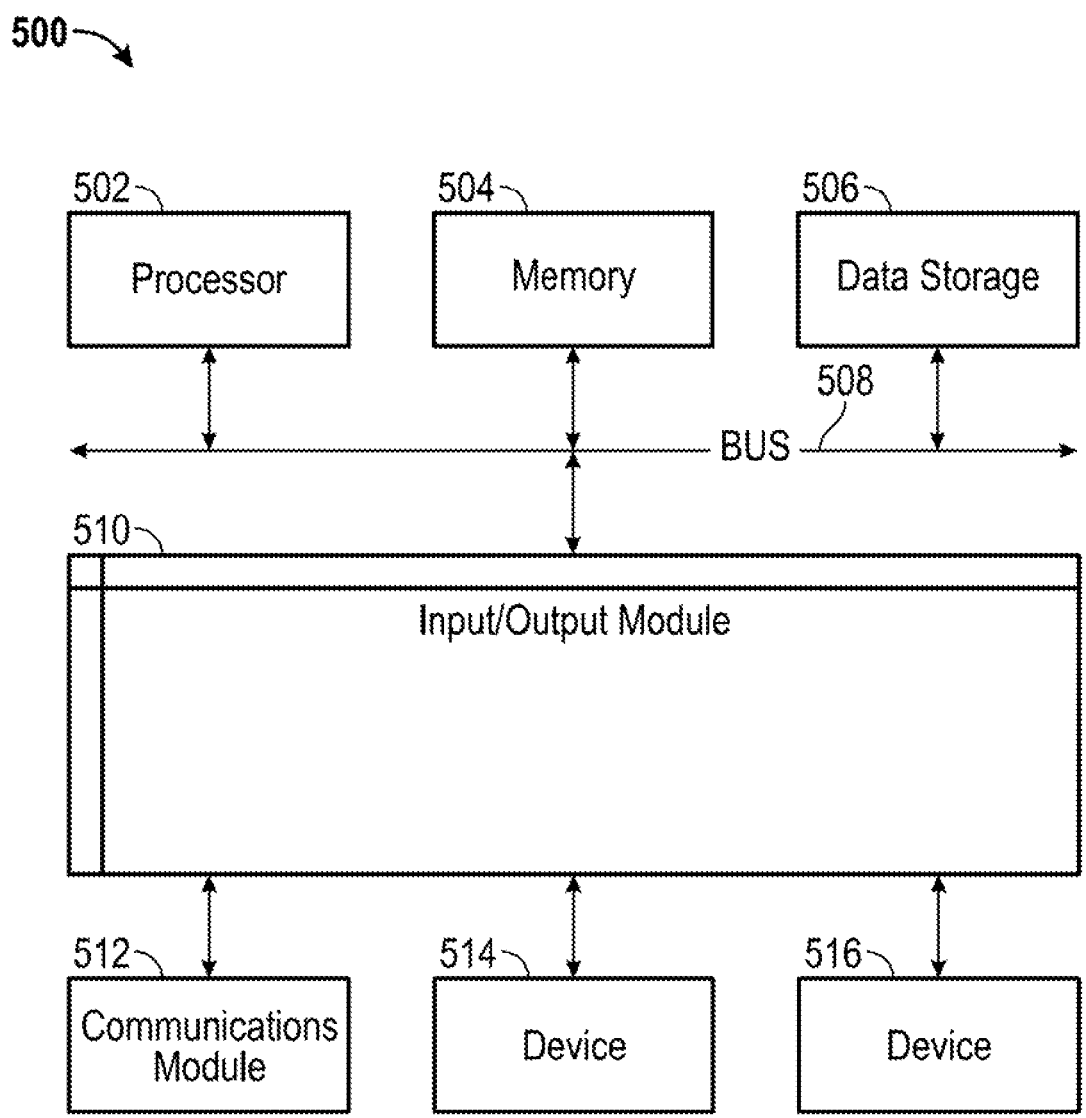
FIG. 5 is a block diagram illustrating an example computer system with which the client and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for providing stored authentication information of one website for a related website, the method comprising:
    receiving a first request to provide, for display, a webpage comprising at least one authentication field;
    receiving an identification of an absolute domain name for the webpage, the absolute domain naming comprising a first hostname;
    identifying a parent domain name from the absolute domain name;
    determining whether stored authentication information for a user and associated with a second hostname that is different than the first hostname is available for the parent domain name, wherein the authentication information is stored in memory from a previous authentication using the authentication information;
    when the stored authentication information is available for the parent domain name, providing, for display, a first notification to populate the stored authentication information for the user in the at least one authentication field, the displayed first notification comprising an indicator of the second hostname and an indicator of the stored authentication information associated with the second hostname;
    receiving a response to the first notification indicating a request to populate the stored authentication information for the user in the at least one authentication field;
    populating the stored authentication information for the user in the at least one authentication field;
    storing a preference indicator of the response to the first notification indicating the request to populate the stored authentication information for the user in the at least one authentication field;
    receiving a second request, subsequent to the first request, to provide, for display, the webpage comprising the at least one authentication field; and
    in response to receiving the second request, either (1) providing, for display, a second notification to populate the stored authentication information for the user in the at least one authentication field based on the stored preference indicator, or (2) populating the stored authentication information for the user in the at least one authentication field of the webpage provided for display in response to the second request based on the stored preference indicator.

2. The method of claim 1, wherein the second notification comprises an indicator of the second hostname.

3. The method of claim 1, wherein the second notification is provided for display in response to a selection of the at least one authentication field.

4. The method of claim 1, wherein the absolute domain name comprises a fully qualified domain name.

5. The method of claim 1, wherein the determining whether the stored authentication information for the user is available for the parent domain name comprises determining whether the parent domain name matches an entry in a list of registered domain names, and the stored authentication information for the user is available for the parent domain name.

6. The method of claim 5, wherein the list of registered domain names comprises a collection of publicly registered domain names and a collection of private additions for domain names.

7. A system for providing stored authentication information of one website for a related website, the system comprising:
    a memory comprising stored authentication information for a user; and
    a processor configured to:
        receive a first request to provide, for display, a webpage comprising at least one authentication field;
        receive an identification of an absolute domain name for the webpage, the absolute domain naming comprising a first hostname;
        identify a parent domain name from the absolute domain name;
        determine whether the stored authentication information for the user and is associated with a second hostname that is different than the first hostname comprises login information for the user for the parent domain name, wherein the authentication information is stored in the memory from a previous authentication using the authentication information; and
        when the stored authentication information comprises the login information for the user for the parent domain name, providing, for display, a first notification to populate the login information for the user in the at least one authentication field, the displayed first notification comprising an indicator of the second hostname and an indicator of the stored authentication information associated with the second hostname;
        receive a response to the first notification indicating a request to populate the login information for the user in the at least one authentication field;
        populate the login information for the user in the at least one authentication field;
        store a preference indicator of the response to the first notification indicating the request to populate the login information for the user in the at least one authentication field;
        receive a second request, subsequent to the first request, to provide, for display, the webpage comprising the at least one authentication field; and
        in response to receiving the second request, either (1) provide, for display, a second notification to populate the login information for the user in the at least one authentication field based on the stored preference indicator, or (2) populate the login information for the user in the at least one authentication field of the webpage provided for display in response to the second request based on the stored preference indicator.

8. The system of claim 7, wherein the second notification comprises an indicator of the second hostname.

9. The system of claim 7, wherein the second notification is provided for display in response to a selection of the at least one authentication field.

10. The system of claim 7, wherein the absolute domain name comprises a fully qualified domain name.

11. The system of claim 7, wherein the determining whether the stored authentication information comprises the login information for the user for the parent domain name comprises determining whether the parent domain name matches an entry in a list of registered domain names, and the login information for the user is available for the parent domain name.

12. The system of claim 11, wherein the list of registered domain names comprises a collection of publicly registered domain names and a collection of private additions for domain names.

13. A non-transitory machine-readable storage medium comprising machine-readable instructions for causing a processor to execute a method for providing stored authentication information of one website for a related website, the method comprising:
    receiving a first request to provide, for display, a webpage comprising at least one authentication field;
    receiving an identification of an absolute domain name for the webpage, the absolute domain naming comprising a first hostname;
    identifying a parent domain name from the absolute domain name;
    determining whether the parent domain name matches an entry in a list of registered domain names, and whether the stored authentication information for the user, which is associated with a second hostname that is different than the first hostname, is available for the parent domain name, wherein the authentication information is stored in memory from a previous authentication using the authentication information; and
    when the stored authentication information is available for the parent domain name, providing, for display, a first notification to populate the stored authentication information for the user in the at least one authentication field, the displayed first notification comprising an indicator of the second hostname and an indicator of the stored authentication information associated with the second hostname;
    receiving a response to the first notification indicating a request to populate the stored authentication information for the user in the at least one authentication field; and
    populating the stored authentication information for the user in the at least one authentication field;
    storing a preference indicator of the response to the first notification indicating the request to populate the login information for the user in the at least one authentication field;
    receiving a second request, subsequent to the first request, to provide, for display, the webpage comprising the at least one authentication field; and
    in response to receiving the second request, either (1) providing, for display, a second notification to populate the login information for the user in the at least one authentication field based on the stored preference indicator, or (2) populating the login information for the user in the at least one authentication field of the webpage provided for display in response to the second request based on the stored preference indicator.

* * * * *